US010877767B2

(12) United States Patent
Grant et al.

(10) Patent No.: US 10,877,767 B2
(45) Date of Patent: Dec. 29, 2020

(54) REGISTER RESTORING BRANCH INSTRUCTION

(71) Applicant: ARM Limited, Cambridge (GB)

(72) Inventors: Alasdair Grant, Cambridge (GB); Edmund Thomas Grimley Evans, Cambridge (GB)

(73) Assignee: ARM Limited, Cambridge (GB)

( * ) Notice: Subject to any disclaimer, the term of this patent is extended or adjusted under 35 U.S.C. 154(b) by 97 days.

(21) Appl. No.: 16/306,969

(22) PCT Filed: Jun. 15, 2017

(86) PCT No.: PCT/GB2017/051751
§ 371 (c)(1),
(2) Date: Dec. 4, 2018

(87) PCT Pub. No.: WO2017/220974
PCT Pub. Date: Dec. 28, 2017

(65) Prior Publication Data
US 2019/0121646 A1   Apr. 25, 2019

(30) Foreign Application Priority Data

Jun. 22, 2016  (GB) .................................. 1610859.9

(51) Int. Cl.
*G06F 9/38* (2018.01)
*G06F 9/30* (2018.01)
*G06F 9/32* (2018.01)

(52) U.S. Cl.
CPC ........ *G06F 9/3861* (2013.01); *G06F 9/30032* (2013.01); *G06F 9/30054* (2013.01);
(Continued)

(58) Field of Classification Search
None
See application file for complete search history.

(56) References Cited

U.S. PATENT DOCUMENTS 5,627,981 A * 5/1997 Adler ...................... G06F 8/443
                                                                712/235
5,850,543 A * 12/1998 Shiell ................... G06F 9/3806
                                                                712/238
(Continued)

FOREIGN PATENT DOCUMENTS

EP       0 213 301       3/1987
EP       0 355 069       2/1990
(Continued)

OTHER PUBLICATIONS

Examination Report dated Dec. 4, 2018 in GB Application No. 1610859.9, 4 pages.
(Continued)

*Primary Examiner* — Eric Coleman
(74) *Attorney, Agent, or Firm* — Nixon & Vanderhye P.C.

(57) ABSTRACT

There is provided an apparatus that includes processing circuitry for performing processing operations specified by program instructions and a target register that stores a target program address. A value register stores a data value. There is also provided an architectural register and an instruction decoder that decodes the program instructions to generate control signals to control the processing circuitry to perform the processing operations. The instruction decoder includes branch instruction decoding circuitry that decodes a register restoring branch instruction to cause the processing circuitry to determine whether the target program address and the data value are valid. If the target program address and the data value are both valid then the processing circuitry is caused to branch to the target program address and update the architectural register to store the data value. Otherwise an error action is taken.

20 Claims, 8 Drawing Sheets

(52) U.S. Cl.
CPC ...... *G06F 9/30058* (2013.01); *G06F 9/30101* (2013.01); *G06F 9/30105* (2013.01); *G06F 9/322* (2013.01); *G06F 9/3818* (2013.01)

(56) References Cited

U.S. PATENT DOCUMENTS

| | | | | |
|---|---|---|---|---|
| 5,964,869 | A * | 10/1999 | Talcott | G06F 9/3806 712/236 |
| 6,189,088 | B1 * | 2/2001 | Gschwind | G06F 9/3842 712/216 |
| 6,338,136 | B1 | 1/2002 | Col et al. | |
| 2002/0062400 | A1 * | 5/2002 | Holze | G06F 9/4486 719/310 |
| 2004/0230779 | A1 * | 11/2004 | Haghighat | G06F 9/30054 712/234 |
| 2005/0132173 | A1 * | 6/2005 | Moyer | G06F 9/3806 712/238 |
| 2008/0229054 | A1 | 9/2008 | Chang et al. | |
| 2009/0119486 | A1 | 5/2009 | Dieffenderfer et al. | |
| 2009/0229054 | A1 | 9/2009 | Yates et al. | |
| 2010/0023730 | A1 * | 1/2010 | Leeland | G06F 9/30134 712/202 |
| 2011/0320787 | A1 * | 12/2011 | Dieffenderfer | G06F 9/30003 712/234 |
| 2012/0089818 | A1 * | 4/2012 | Craske | G06F 9/30145 712/209 |
| 2012/0233442 | A1 * | 9/2012 | Shah | G06F 9/3851 712/207 |

FOREIGN PATENT DOCUMENTS

| | | |
|---|---|---|
| EP | 0 689 131 | 12/1995 |
| EP | 1 462 933 | 9/2004 |
| WO | 2006/132807 | 12/2006 |

OTHER PUBLICATIONS

International Search Report and Written Opinion of the ISA for PCT/GB2017/051751, dated Sep. 19, 2017, 12 pages.
Combined Search and Examination Report for GB Patent Application No. 1610859.9, dated Dec. 20, 2016, 10 pages.

* cited by examiner

```
again:   LD   x1,[x17,#...]    ; load branch destination
         MSR  BDEST,x1
         LD   x1,[x17,#...]    ; load value of x17 at destination
         MSR  BRVAL,x1
         LD   x1,[x17,#...]    ; load value of x1 at destination
         BRR  x17              ; PC <- BDEST, x17 <- BRVAL
         B    again
```

FIG. 2

```
; x17=save, BDEST invalid, BRVAL invalid
LD   x1,[x17,#...]
; x17=save, x1=XYZ, BDEST invalid, BRVAL invalid
MSR  BDEST,x1
; x17=save, x1=XYZ, BDEST=XYZ, BRVAL invalid
LD   x1,[x17,#...]
; x17=save, BDEST=XYZ, x1=117, BRVAL invalid
MSR  BRVAL,x1
; x17=save, BDEST=XYZ, x1=117, BRVAL=117
LD   x1,[x17,#...]
; x17=save, BDEST=XYZ, BRVAL=117, x1=101
BRR  x17
; assign x17←BRVAL=117, branch to BDEST=XYZ
; x17=117, x1=101, BDEST invalid, BRVAL invalid
; resume execution from XYZ
```

FIG. 4

```
; x17=save, BDEST invalid, BRVAL invalid
LD   x1,[x17,#...]
; x17=save, x1=XYZ, BDEST invalid, BRVAL invalid
MSR  BDEST,x1
; x17=save, x1=XYZ, BDEST=XYZ, BRVAL invalid
LD   x1,[x17,#...]
; x17=save, BDEST=XYZ, x1=117, BRVAL invalid
MSR  BRVAL,x1
; x17=save, BDEST=XYZ, BRVAL=117
LD   x1,[x17,#...]
; x17=save, BDEST=XYZ, BRVAL=117, x1=101
; INTERRUPT
; RESUME
; x17=save, x1=101, BDEST invalid, BRVAL invalid
BRR  x17
; fall through to recovery code
; x17=save, x1=101
; re-execute sequence
```

FIG. 5

REGISTER RESTORING BRANCH INSTRUCTION

This application is the U.S. national phase of International Application No. PCT/GB2017/051751 filed Jun. 15, 2017 which designated the U.S. and claims priority to GB 1610859.9 filed Jun. 22, 2016, the entire contents of each of which are hereby incorporated by reference.

The present technique relates to the field of data processing.

In a data processing apparatus, it is often desirable to branch or jump from one part of the program to another part of the program. This can be achieved by storing a target program address in a register and then issuing an instruction to the processor that causes the processor to branch (jump) to the program address specified in the register. Sometimes, however, it is necessary for the registers to store particular values when execution of a section of code is started. For example, when returning to a process from an exception handling routine, it is necessary to restore the state of all registers to what they were prior to the exception being handled, since those registers might have been storing intermediate data for the process. This necessity, however, cannot be met if a target program address for a branch instruction is being stored in one of registers. Similarly, loading values from memory into the registers can require one of the registers to store the memory location. Accordingly, it can be difficult for every single register's state to be restored.

Viewed from a first example configuration, there is provided an apparatus comprising: processing circuitry to perform processing operations specified by program instructions; a target register to store a target program address; a value register to store a data value; an architectural register; and an instruction decoder to decode the program instructions to generate control signals to control the processing circuitry to perform the processing operations, wherein the instruction decoder comprises branch instruction decoding circuitry to decode a register restoring branch instruction to cause the processing circuitry to determine whether the target program address and the data value are valid and if the target program address and the data value are both valid, to branch to the target program address and update the architectural register to store the data value, and otherwise to take an error action.

Viewed from a second example configuration, there is provided a method for processing data in a system comprising: a target register to store a target program address; a value register to store a data value; and an architectural register, the method including the steps: performing processing operations specified by program instructions; decoding the program instructions to generate control signals to control the performing of the processing operations, wherein the decoding comprises decoding a register restoring branch instruction to determine whether the target program address and the data value are valid and if the target program address and the data value are both valid, to branch to the target program address and update the architectural register to store the data value, and otherwise to take an error action.

Viewed from a third example configuration, there is provided an apparatus comprising: means for performing processing operations specified by program instructions; means for storing a target program address; means for storing a data value; an architectural register; and means for decoding the program instructions to generate control signals to control the means for performing processing operations to perform the processing operations, wherein means for decoding the program instructions comprises branch instruction decoding means for decoding a register restoring branch instruction to cause the means for performing processing operations to determine whether the target program address and the data value are valid and if the target program address and the data value are both valid, to branch to the target program address and update the architectural register to store the data value, and otherwise to take an error action.

The present technique will be described further, by way of example only, with reference to embodiments thereof as illustrated in the accompanying drawings, in which:

FIG. 2 shows program code comprising a register restoring branch instruction;

Figure 3:
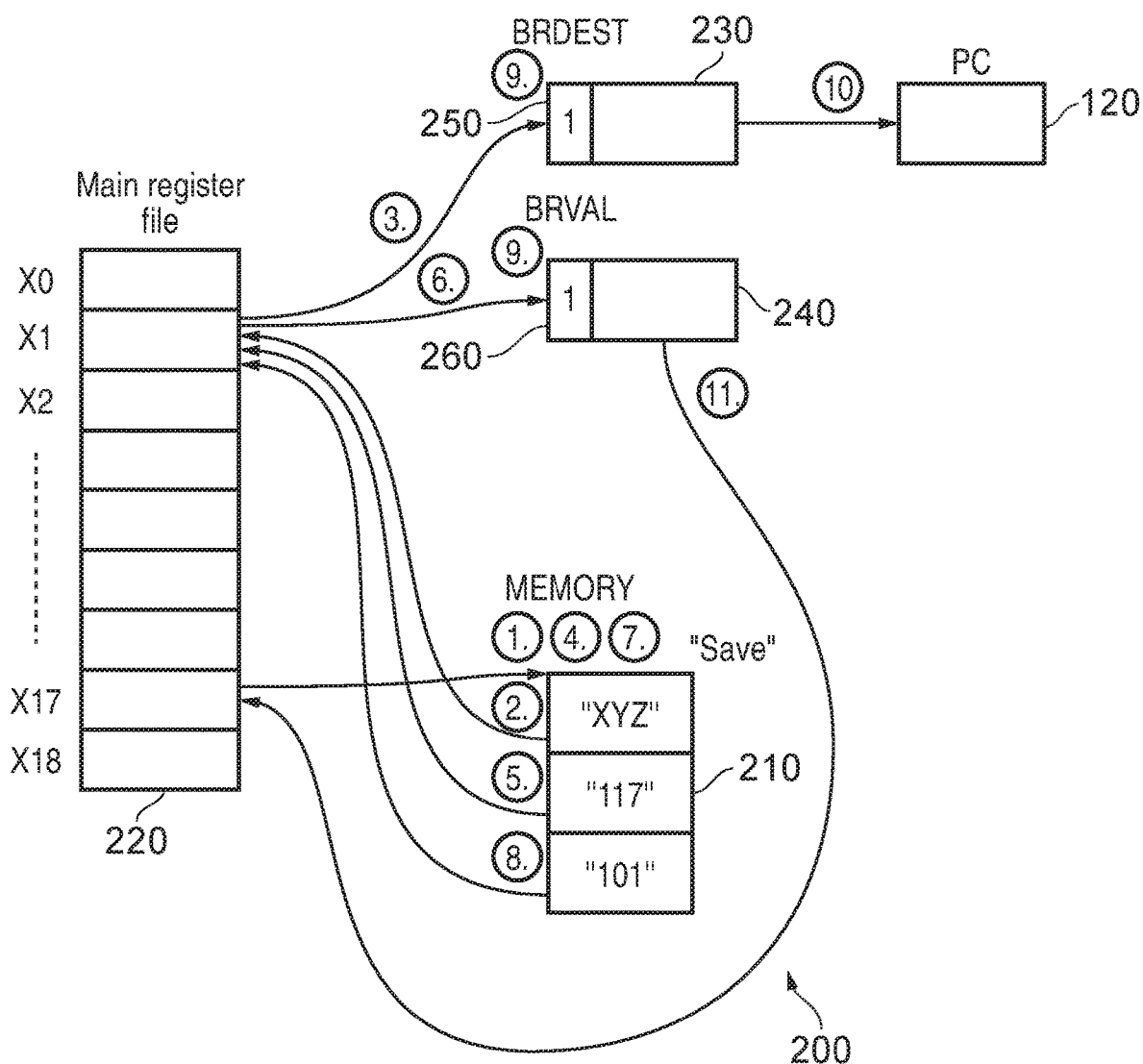
Figure 6:
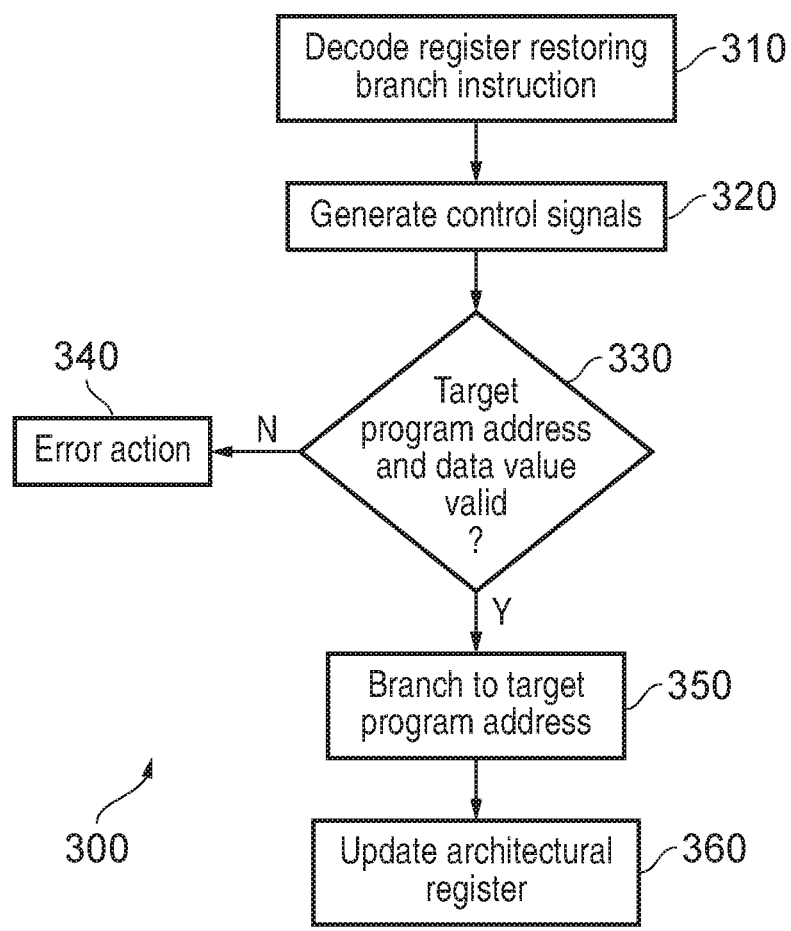
Figure 7:
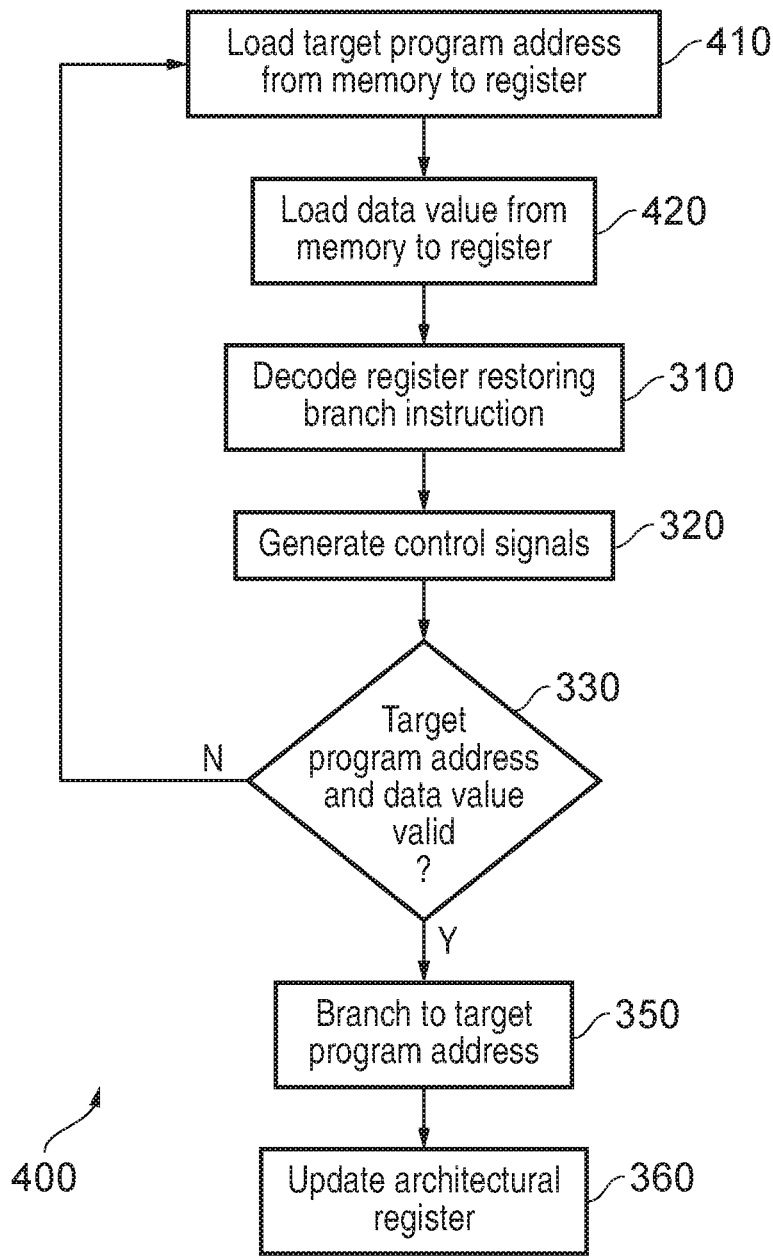
Figure 8:
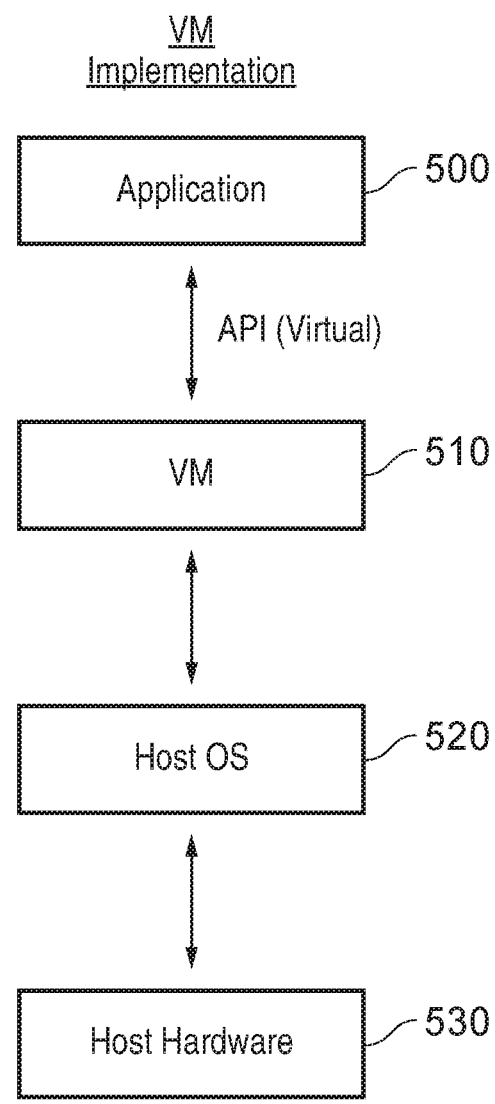

FIG. 3 schematically illustrates how the execution of the code shown in FIG. 2 affects the architecture in accordance with one embodiment;

FIG. 4 illustrates how values stored in different registers change during the setup and execution of the register restoring branch instruction in accordance with one embodiment;

FIG. 5 illustrates how values stored in different registers change during the setup and failed execution of the register restoring branch instruction in accordance with one embodiment;

FIG. 6 shows a flowchart that illustrates a method for data processing in accordance with one embodiment;

FIG. 7 shows a flowchart that illustrates the use of a register restoring branch instruction in accordance with one embodiment; and FIG. 8 shows a flowchart illustrating the operation of a virtual machine in accordance with one embodiment.

Before discussing the embodiments with reference to the accompanying figures, the following description of embodiments and associated advantages is provided.

In accordance with one example configuration there is provided an apparatus comprising: processing circuitry to perform processing operations specified by program instructions; a target register to store a target program address; a value register to store a data value; an architectural register; and an instruction decoder to decode the program instructions to generate control signals to control the processing circuitry to perform the processing operations, wherein the instruction decoder comprises branch instruction decoding circuitry to decode a register restoring branch instruction to cause the processing circuitry to determine whether the target program address and the data value are valid and if the target program address and the data value are both valid, to branch to the target program address and update the architectural register to store the data value, and otherwise to take an error action.

The target register stores a target program address, i.e. a program address to where a branch is to occur. The value register stores a data value which stores a replacement value for one of the architectural registers. The register restoring branch instruction is an instruction that specifies an architectural register. When executed, the register restoring branch instruction checks whether the target register and value register contain valid values. If not, then an error action occurs. Otherwise, the instruction branches to the target program address stored in the target register and then updates the specified architectural register to store the data value held in the value register. All of these operations or steps occur atomically. In other words, the execution of the register restoring branch instruction cannot be interrupted mid-way through its execution by another instruction. Additionally, the operations of branching and updating the specified architectural register can be performed in reverse order. The architectural register could be a register that is used in order to set-up other registers for the register restoring branch instruction. For example, the architectural register could store the address of a location in memory where replacement register values for the code being branched to are stored. In this manner, it is possible to both restore the architectural register so that it has the correct value and perform a branch instruction substantially simultaneously. By checking whether the target register and value register contain valid values, it is possible to handle the situation where the values held in the target register and the value register have been modified since they were set up in preparation for executing the register restoring branch instruction. For example, by making such a check, it is possible to avoid the situation in which specific values are loaded into those registers, an interrupt or exception occurs that causes those values to be changed, and then for the register restoring branch instruction to be executed, which would cause the register restoring branch instruction to be executed using incorrect values.

In some embodiments, the error action is to cause a pipeline flush. A pipeline flush causes all stages in the pipeline to be invalided. Often, in anticipation of a branch occurring, a system might start to insert instructions into the pipeline from the branch destination. Consequently, if the branch does not take place, it is necessary to flush the pipeline so that those instructions are not fully executed.

In some embodiments, the error action is to branch to a further instruction. The further instruction could relate to recovery code that is provided to recover from the situation in which the register restoring branch instruction fails. In some embodiments, the further instruction is prior to the register restoring branch instruction in the program instructions. For example, the further instruction could set up a loop in which code that sets up the register restoring branch instruction and the register restoring branch instruction itself is repeatedly executed until the register restoring branch instruction succeeds.

In some embodiments, the error action is to treat the register restoring branch instruction as a NOOP instruction. When executed, a processor generally will take no action in respect of a NOOP instruction, except to increment the program counter and thereby move on to the next instruction. In such embodiments, if the register restoring branch instruction does not successfully branch and restore (due to the target register or value register being invalid) then no further action occurs as part of the execution of the register restoring branch instruction except to increment the program counter. Subsequent instructions to the register restoring branch instruction can then be performed.

In some embodiments, at least one of the value register and the target register has an associated validity indicator to indicate whether the data value or the target program address, respectively, has been flushed. Such flushable registers could be invalidated at substantially any time (e.g. by a process other than the one that is currently being executed). In order to determine whether the register has been flushed, a validity indicator is provided.

There are a number of ways in which such a validity indicator can be provided. In some embodiments, the processing circuitry determines whether the target program address is valid by examining a target valid flag. The target valid flag could, for example, be provided as a special bit within the target register, which is not exposed in the architecture such that a user cannot directly edit the target valid flag. The architecture can set the target valid flag when the user specifies a value for the target register and can clear the target valid flag when any situation arises in which the target program address might have been changed. For example, in some embodiments, the processing circuitry is configured to clear the target valid flag, to indicate that the target program address is invalid, in response to an exception. This is because during an exception, it is possible that the value in the target register might have been changed and so it cannot be safely assumed that the value in the target register is valid. In some other embodiments, it is determined whether or not the target program address is valid based on whether or not the target program address has a special value that would not otherwise be valid. For example, the value "0" for the target program address might be indicative that the target program address is invalid if the first instruction in a series of instructions occurs at a target program address that is above 0 (e.g. 1). Accordingly, any time the target register is invalidated, the target program address value can be updated to the special value in order to indicate that the target register does not contain a valid value. Such an approach removes the need to provide an additional bit to indicate whether or not the value held in the register is valid.

In some embodiments, the instruction decoder comprises move instruction decoding circuitry to decode a move instruction to cause the processing circuitry to store a provided value in the target register and to set the target valid flag, to indicate that the target program address is valid. In this way, it is possible for the target valid flag to be set without being directly exposed to the user, which reduces the chances of the valid flag being set or cleared incorrectly. When the user inserts a value into the target register, the corresponding valid flag will be set in order to indicate that the target program address is valid.

There are also a number of ways in which it can be determined whether or not the data value is valid. In some embodiments, the processing circuitry determines whether the data value is valid by examining a value valid flag. The value valid flag could, for example, be provided as a special bit within the value register, which is not exposed in the architecture such that a user cannot directly edit the value valid flag. The architecture can set the value valid flag when the user specifies a value for the value register and can clear the value valid flag when any situation arises in which the data value might have been changed. For example, in some embodiments, the processing circuitry is configured to clear the value valid flag, to indicate that the data value is invalid, in response to an exception. This is because during an exception, it is possible that the value in the value register might have been changed. It is therefore assumed that when an exception occurs, the data value will no longer be valid. In some other embodiments, it is determined whether or not the data value is valid based on whether or not the data value has a special value. For example, the value "0" for the data value might be indicative that the data value is invalid. Accordingly, any time the value register is invalidated, the data value can be updated to the special value in order to indicate that the data value register does not contain a valid value. Such an approach removes the need to provide an additional bit to indicate whether or not the value held in the register is valid.

In some embodiments, the instruction decoder comprises move instruction decoding circuitry to decode a move instruction to cause the processing circuitry to store a provided value in the value register and to set the value valid flag, to indicate that the data value is valid. In this way, it is possible for the value valid flag to be set without being directly exposed to the user, which reduces the chances of the valid flag being set or cleared incorrectly. When the user inserts a value into the target register, the corresponding valid flag will be set in order to indicate that the target program address is valid.

In some embodiments, the register restoring branch instruction provides an explicit reference to the architectural register. This increases the flexibility of the surrounding code. In particular, it makes it possible to use an arbitrary register for setting up the register restoring branch instruction. For example, in one instance, a register x12 could be used to store a memory location where replacement register values are stored and in another instance, a register x17 could be used to store the memory location. In each case, the register that has been used to store the memory location (for example) is explicitly provided in a field of the register restoring branch instruction. In other embodiments, the architectural register is implicitly specified. For example, the architectural register might always be register x17. In such cases, there is no need for the architectural register to be provided in a field of the register restoring branch instruction. However, this provides less flexibility, since it would then be necessary to always use register x17 as, e.g. the register storing the memory location of the replacement register values. This could complicate matters if register x17 is being used for another purpose.

In some embodiments, the target program address and a program address of the register restoring branch instruction are both in userspace. Userspace can be considered to be the area of memory in which user applications execute as distinct from kernelspace in which the kernel and its associated services execute. Applications that run within the kernelspace are often privileged. For example, they may have less restricted access to memory than applications that run in userspace. The present technique is applicable to the situation in which the target program address and a program address of the register restoring branch instruction are both in userspace, since the present technique does not require that any process is given additional permissions or restricted knowledge regarding the underlying architectural state.

In some embodiments, the processing circuitry uses a 64-bit architecture. In a 64-bit architecture, it is particularly desirable for memory locations to be stored in a register since providing this information from the memory itself can be particularly time consuming in a 64-bit architecture. The present technique is applicable to 64-bit architectures.

In some embodiments, a virtual machine computer program comprises program instructions to control a host data processing apparatus to provide an instruction execution environment corresponding to an apparatus of one of the above configurations.

Particular embodiments will now be described with reference to the figures.

Figure 1:
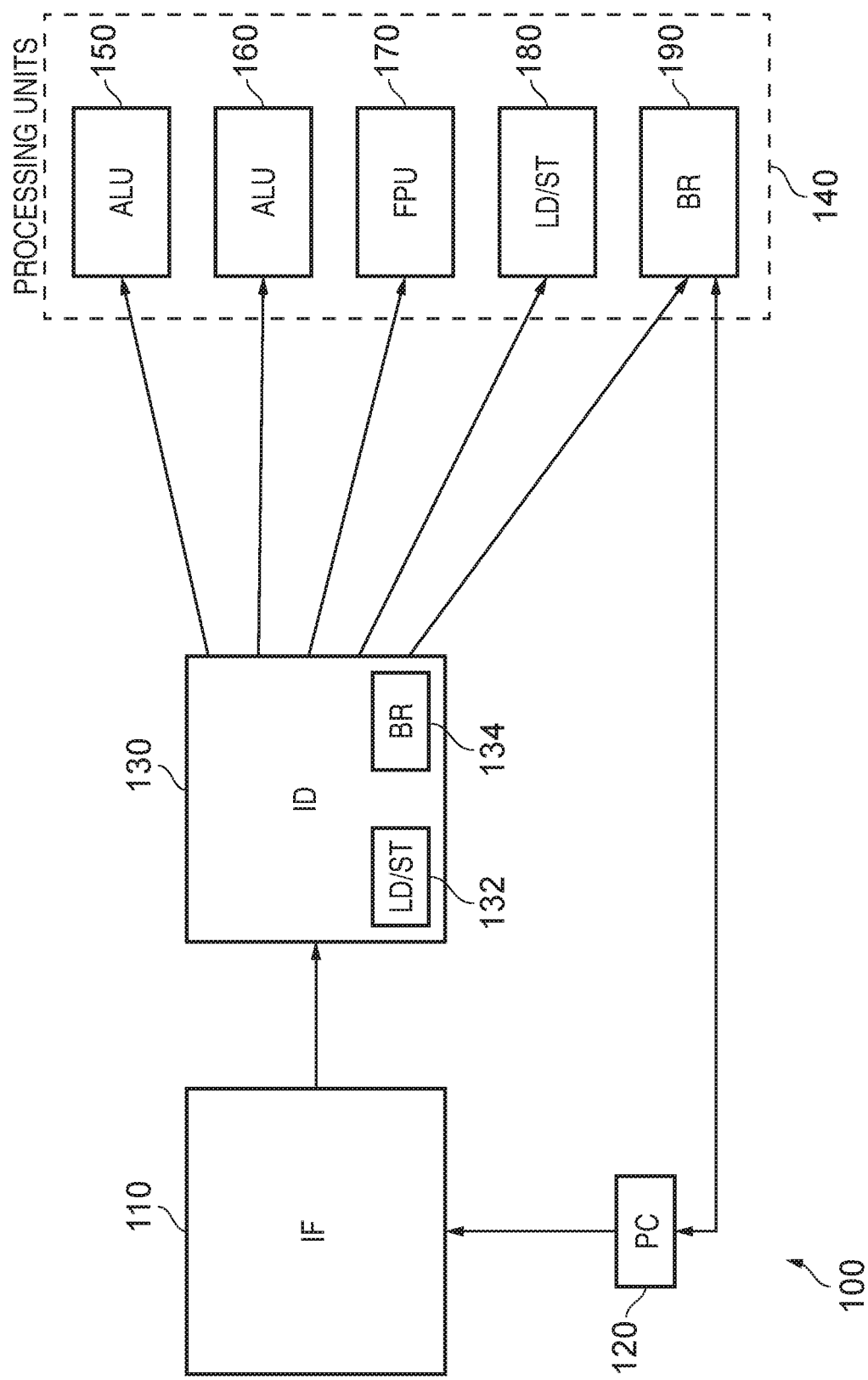
FIG. 1 illustrates an example of a pipeline in accordance with one embodiment.

FIG. 1 illustrates a pipeline 100 in accordance with one embodiment. The pipeline 100 comprises a number of stages/circuitries. Firstly, in an instruction fetch stage 110, the value of a program counter 120 is consulted and an instruction at the program address stored in the program counter 120 is fetched. This is then passed to an instruction decode stage 130 where the instruction is decoded. This results in one or more signals being generated. In this embodiment, the decode stage comprises load instruction decoding circuitry 132 for decoding load instructions and generating corresponding signals, as well as branch instruction decoding circuitry 134 for decoding branch instructions and generating corresponding signals. The signal or signals generated within the instruction decode stage 130 in response to an instruction are passed to one or more processing units 140. In this example, the processing units comprise a pair of Arithmetic Logic Units (ALUs) 150, 160, which perform integer logic and arithmetic operations, a Float Point Unit (FPU) 170 that performs floating point arithmetic operations, a load/store unit 180 that interfaces with a memory or memory hierarchy, and a branch unit 190 that performs operation that change the flow of control of the program. For example, the branch unit 190 might deal with adjusting the program counter 120 and can respond to explicit branch or jump instructions. Note that the different stages (i.e. units) in the pipeline 100 can operate independently on each other. For example, while one instruction is being fetched, another instruction can be decoded and another instruction could be executed by the processing units 140.

FIG. 2 shows program code comprising a register restoring branch instruction (BRR). The code shown in FIG. 2 illustrates how the register restoring branch instruction is used. Firstly, a load instruction (LD) causes the destination of the branch instruction to be loaded from an address (or addresses) in memory that is referred to in a register x17 to a register x1. In this example, register x17 is an example of the architectural register, which is used to set up the register restoring branch instruction (BRR). The destination is then loaded via a Move to System Register (MSR) instruction, from register x1 to the BDEST register, which is an example of the target register. Note that in other embodiments, any instruction that has the functionality by which a data value can be moved from a general purpose register to "the system" can be used. This includes instructions that write to configuration or system registers that behave similarly to general purpose registers as well as instructions that are purely side-effect based (e.g. PMSWINC). The instruction, when executed by the load/store processing unit 180 also causes a valid bit for the BDEST register to be set, thereby indicating that the contents of the BDEST register are valid. The next load instruction then causes the new data value to be loaded from an address (or addresses) in memory that is referred to in register x17 to a register x1. Again, an MSR instruction then copies this data from x1 to the BRVAL register, which is an example of the value register. This instruction, when executed by the load/store processing unit 180 also causes a valid bit for the BRVAL register to be set to indicate that the content of the BRVAL register is valid. A third load instruction is then executed in order to replace the value in x1 with data stored in memory at an address referred to by register x17. It will be appreciated that the same instruction cannot be performed for register x17 itself, since register x17 is necessary in order to provide a memory address from which data can be retrieved. Furthermore, register x17 is necessary in order to provide a memory address from where data can be re-retrieved in the event that the BDEST register is invalidated. The register restoring branch instruction solves this problem. When decoded by the branch instruction decoding circuitry 134, the generated signals cause, for example, the branch unit 190 to firstly check that the flags are set for BDEST and BRVAL. Assuming the flags are set, i.e. that the data in the BDEST and BRVAL registers is valid, the value of the program counter (PC) is updated to be equal to the value stored in BDEST, i.e. the program branches to the address stored in BDEST. The data value stored in register x17, which in this embodiment is explicitly specified in a field of the BRR instruction, is then updated with the data stored in register BRVAL. In the event that one of the flags is not set (i.e. if one of BDEST or BRVAL is invalid) then the BRR instruction is executed as if it were a NOOP instruction and the flow continues to the next instruction, which is a direct branch instruction (B) to the label "again". In other words, if this last instruction is executed, the code loops around and executed again. Note that in these examples, not all of the specific parameters of the load (LD) instructions are provided. However, it will be understood that register x17 is used to point to a structure in memory comprising a number of data values, e.g. for a thread context, and that the load instructions shown in sequentially load the data values in the structure into the registers.

Note that in this embodiment, the architectural register (x17) is explicitly referred to in a field of the BRR instruction. This increases flexibility, since it allows a user (or a compiler) to make use of any architectural register for setting up the register restoring branch instruction. However, in other embodiments, this is not possible and instead the BRR instruction itself implicitly controls the register that is updated with the value stored in BDEST.

FIG. 3 schematically illustrates the effect on a 64-bit architecture 200 of executing the code shown in FIG. 2. The architecture 200 comprises a memory 210, which can be accessed via for example a load/store processing unit 180. FIG. 3 shows a location of memory 210 referred to by the identifier "save". This section of memory comprises three words, the first of which contains the data "XYZ", the second of which contains the data "117" and the third of which contains the data "101". The architecture also comprises a main register file 220 comprising a number of architectural registers (e.g. x0, x1, x2, . . . , x17, x18). Each of these registers is general purpose and can therefore be accessed (written to/read from) directly. The architecture also includes a BRDEST register 230, which is used to store a target program address that is the target of the branch when the register restoring branch instruction (BRR) is executed. The branch occurs by the value stored in the program counter 120 being updated, e.g. by the branch unit 190. A BRVAL register 240 is also provided, which stores a data value which is moved to one of the architectural registers as part of the register restoring branch instruction (BRR) execution. In this embodiment, each of the BRDEST 230 and BRVAL 240 registers comprises a flag 250, 260, to indicate whether or not the value stored in BRDEST and BRVAL is valid. Here, the value "1" is used to indicate that the flag is set, i.e. that the value in the register is valid. The flags 250, 260 cannot be directly set or cleared. However, storing a value in one of BRDEST 230 or BRVAL 240 causes the corresponding flag to be set. Meanwhile, taking an exception or interrupt or executing the register restoring branch instruction itself causes the flags to be cleared (e.g. set to "0") to thereby indicate that the values stored in the registers are invalid, or at least that they cannot be trusted to be valid.

Note that in some other embodiments, the registers BRDEST and BRVAL are architectural registers and consequently can be directly accessed rather than being accessed only via the MSR instruction, which limits how the registers are affected and which takes care of setting the corresponding valid flags. Indeed, in some embodiments, the BRDEST and BRVAL registers may even be flushable, which is to say that the values in those registers (as distinct from the flags) could be changed at any time.

The code shown in FIG. 2 causes a number of different operations to occur on the architecture. These are shown in FIG. 3 as being broken down into 11 different steps. In a first step, register x17 is used to provide an address to an area of memory. This could be, for example, a structure that stores the saved context of a thread where the structure comprises a number of data values, which are sequentially loaded into registers. In a second step, data stored at that memory address is stored in register x1. In a third step, the data stored in register x1 is copied to the BRDEST register 230 and the valid flag for BRDEST is set. In a fourth step, the register x17 is again used to provide an address to an area of memory and in a fifth step the data stored in a next memory address after the one referred to by x17 is copied to register x1. In step six, the data stored in register x1 is copied to the BRVAL register 240 and the valid flag for BRVAL is set (e.g. to 1). In a step seven, the register x17 is again used to provide an address to an area of memory and in an eighth step the data stored in a next memory address at location x17 is copied to register x1. At step nine, the register restoring branch instruction is executed with an explicit reference to register x17. This causes the valid flags in BRDEST and BRVAL to be checked. If valid then at step 10, the value stored in BRDEST is used to update the program counter (PC) 120. Also if valid then at step 11, the value stored in BRVAL is stored in register x17. If one of the two flags is clear (i.e. if one of the two values is invalid) then an error action is performed. The error action could include one or more different sub-actions, including flushing the pipeline (e.g. emptying the pipeline), treating the register restoring branch instruction as a NOOP instruction, or performing an alternative branch, e.g. to an instruction before the register restoring branch instruction in order to re-set up and execute the register restoring branch instruction again.

FIG. 4 illustrates how values stored in different registers change during the setup and execution of the register restoring branch instruction in accordance with one embodiment. In this embodiment, rather than providing flags for each of the BDEST and BRVAL registers to indicate that the values stored in those registers are valid, special values are defined that mark the contents of those registers are being invalid. Initially register x17 is used to point to a saved data location ("save") in the memory, which corresponds to a data structure storing a saved thread context. Meanwhile registers BDEST and BRVAL both contain special "invalid" values, thereby indicating that BDEST and BRVAL are invalid. After performing the first load instruction, register x17 still points to "save". However, register x1 will now contain the data value stored in the memory at address "save"—XYZ. After performing the first MSR instruction, BDEST will hold the value stored in register x1 (i.e. XYZ). BDEST no longer contains the special invalid value and so implicitly is valid. The value in register x1 and the value of BRVAL remain unchanged. After executing the second load instruction, the next data value ("117") is loaded into register x1. The other data values remain unchanged. The second MSR instruction causes the value stored in register x1 to be stored in BRVAL. BRVAL no longer contains the special invalid value and so, implicitly, the data in BRVAL is valid. The third and final load instruction causes the next data value ("101") to be loaded into register x1. At this point, therefore, x17 still points to "save", meanwhile BDEST holds the value XYZ and BRVAL holds the value 117. Register x1 holds the value 101. On executing the register restoring branch instruction (BRR) instruction, which explicitly refers to register x17 as the register to be updated during the process, the values stored in BDEST and BRVAL are checked. In this case, because neither register stores the special invalid value, the values are considered to be valid and so the process proceeds. In particular, the value stored in BRVAL (117) is assigned to register x17 and the program branches to the program address stored in BDEST (XYZ) by updating the program counter 120 to XYZ. Accordingly, at the end of the execution of the BRR instruction, register x1 stores the value 101, register x17 stores the value 117. In this particular example, as a consequence of issuing the register restoring branch instruction, the values in BDEST and BRVAL are invalidated. Consequently, execution can resume from the instruction at program address XYZ with all of the registers storing the correct values.

In this embodiment, both the location of the BRR instruction and the location of XYZ are assumed to be in userspace. In other words, the program address of the BRR instruction and the program address XYZ are in an unprivileged part of memory. Indeed, aside from access to the BDEST and BRVAL registers, which is controlled via the MSR instruction, it can be seen that no special access is required to any part of the underlying architecture. Indeed, no access is required to any resource that would not ordinarily be available to a userspace process.

FIG. 5 illustrates how values stored in different registers change during the setup and failed execution of the register restoring branch instruction in accordance with one embodiment. Here the process is the same as described with reference to FIG. 4. However, in this example, after executing the third load instruction ("LD x1,[x17,# . . . ]"), an interrupt occurs. During this interrupt, the values stored in the BDEST or BRVAL registers might change. Accordingly, the interrupt service routine automatically sets the values of BDEST and BRVAL to being invalid. However, the values held in general-purpose registers are typically restored when returning from an interrupt. Consequently, when the register restoring branch instruction BRR is executed, specifying register x17, register x17 will still point to the saved data location in memory ("save") and x1 will still store the value 101. On the other hand, BDEST and BRVAL will be invalid. Hence, at the first step of executing the BRR instruction, it is determined that at least one of BDEST and BRVAL is invalid and hence no further execution occurs except to increment the program counter (i.e. the instruction is otherwise treated as a NOOP instruction). The flow of execution therefore "falls through" to recovery code below the BRR instruction. As was shown in FIG. 2, this can be as simple as a branch instruction that causes the code to be re-executed. It is anticipated that the number of occasions in which the BDEST or BRVAL values are invalidated will be particularly small and hence, by re-executing the sequence, it is hoped that the register restoring branch instruction will be successful on a subsequent occasion.

FIG. 6 shows a flowchart 300 that illustrates a method for data processing in accordance with one embodiment. In a step 310, a register restoring branch instruction specifying an architectural register is decoded. The instruction that is decoded corresponds with an instruction that has been fetched (e.g. using an instruction fetcher 110) based on a value stored in a program counter 120. The decoding can be carried out by, for example, an branch instruction decoding circuitry 134 in an instruction decoder 130 in a pipeline 100. At step 320, the decoded instruction causes one or more control signals to be generated. These control signals are sent to one or more processing units 140, which cause processing operations to occur. At step 330, the various processing operations as specified by the instruction (and implemented via the control signals) causes the processing units 140 such a branch unit 190 to determine whether the target program address and the data value are both valid. These values are stored, for example, in BRDEST and BRVAL registers respectively. If one of the values is invalid, then at step 340, an error action is performed. Otherwise, at step 350, the processing units 140 cause a branch to occur to the target program address and then at step 360, the architectural register is updated with the data value. The specific architectural register can be explicitly specified by the register restoring branch instruction itself. Alternatively, the identity of the architectural register could be specified implicitly. In other words, the value stored in register BRVAL will always be saved to the same register.

FIG. 7 shows a flowchart 400 that illustrates the use of a register restoring branch instruction in accordance with one embodiment. Where the step is the same as shown in FIG. 6, the same reference numerals have been used. At a step 410, a target program address is loaded from memory into a register (e.g. BRDEST). This step may involve the execution of one or more instructions each of which must be fetched, decoded and executed via processing units 140. Then, at a step 420, a data value is loaded from memory into a register (e.g. BRVAL). Again, this step might involve the execution of one or more instructions each of which must be fetched, decoded and executed via processing units 140. The register restoring branch instruction is then decoded and performed as shown in FIG. 6 with reference to steps 310, 320, 330, 350 and 360. However, at step 330, if the processing units 140 determine that one of the target program address and the data value are invalid, then the error action that would be taken at step 340 is for the process to return to step 410 where the target program address is loaded from memory into the register (BRDEST). In this way, the process continues until the branch and update of the architectural register successfully occurs in steps 350 and 360.

FIG. 8 illustrates a virtual machine implementation that may be used. Whilst the above described embodiments generally implement the present techniques in terms of apparatus and methods for operating specific processing hardware supporting the techniques concerned, it is also possible to provide so-called virtual machine implementations of hardware devices. These virtual machine implementations run on a host processor 530 typically running a host operating system 520 supporting a virtual machine program 510. This may require a more powerful processor to be provides in order to support a virtual machine implementation which executes at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, program instructions including one or more examples of the above-discussed processor state check instruction may be executed from within the application program 500 using the virtual machine program 510 to model their interaction with the virtual machine hardware.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Also in the present application, the word "set" in relation to a register or flag can include configuring the register or flag to have the value "1" or "0". Similarly, the word "clear" in relation to a register or flag refers to the opposite of the operation performed for "set" and could therefore refer to configuring the register or flag to have the value "0" or "1".

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to perform processing operations specified by program instructions;
a target register to store a target program address;
a value register to store a data value;
an architectural register; and
an instruction decoder to decode the program instructions to generate control signals to control the processing circuitry to perform the processing operations,
wherein the instruction decoder comprises branch instruction decoding circuitry to decode a register restoring branch instruction to cause the processing circuitry to determine whether the target program address and the data value are valid, and
if the target program address and the data value are both valid, to branch to the target program address and update the architectural register to store the data value, and
otherwise to take an error action.

2. An apparatus according to claim 1, wherein the error action is to cause a pipeline flush.

3. An apparatus according to claim 1, wherein the error action is to branch to a further instruction.

4. An apparatus according to claim 3, wherein the further instruction is prior to the register restoring branch instruction in the program instructions.

5. An apparatus according to claim 1, wherein the error action is to treat the register restoring branch instruction as a NOOP instruction.

6. An apparatus according to claim 1, wherein at least one of the value register and the target register has an associated validity indicator to indicate whether the data value or the target program address, respectively, has been flushed.

7. An apparatus according to claim 1, wherein:
the processing circuitry determines whether the target program address is valid by examining a target valid flag.

8. An apparatus according to claim 7, wherein the processing circuitry is configured to clear the target valid flag, to indicate that the target program address is invalid, in response to an exception.

9. An apparatus according to claim 7, wherein the instruction decoder comprises move instruction decoding circuitry to decode a move instruction to cause the processing circuitry to store a provided value in the target register and to set the target valid flag, to indicate that the target program address is valid.

10. An apparatus according to claim 1, further comprising:
the processing circuitry determines whether the data value is valid by examining a value valid flag.

11. An apparatus according to claim 10, wherein the processing circuitry is configured to clear the value valid flag to indicate that the target program address is invalid, in response to an exception.

12. An apparatus according to claim 10, wherein the instruction decoder comprises move instruction decoding circuitry to decode a move instruction to cause the processing circuitry to store a provided value in the value register and to set the value valid flag, to indicate that the data value is valid.

13. An apparatus according to claim 1, wherein the register restoring branch instruction provides an explicit reference to the architectural register.

14. An apparatus according to claim 1, wherein the target program address and a program address of the register restoring branch instruction are both in user-space.

15. An apparatus according to claim 1, wherein the processing circuitry uses a 64-bit architecture.

16. A computer program product storing in non-transitory form a virtual machine computer program comprising program instructions to control a host data processing apparatus to provide an instruction execution environment corresponding to the apparatus according to claim 1.

17. A method for processing data in a system comprising:
a target register to store a target program address;
a value register to store a data value; and
an architectural register,
the method including the steps:
performing processing operations specified by program instructions;
decoding the program instructions to generate control signals to control the performing of the processing operations, wherein
the decoding comprises decoding a register restoring branch instruction to determine whether the target program address and the data value are valid and if the target program address and the data value are both valid, to branch to the target program address and update the architectural register to store the data value, and otherwise to take an error action.

18. A method according to claim 17, wherein the decoding further comprises:
decoding one or more move instructions to access the target program address and the data value from memory and to store the target program address in the target register and the data value in the value register, wherein
the step of decoding the one or more move instructions occurs prior to the step of decoding the register restoring branch instruction.

19. A computer program product storing in non-transitory form a computer program for performing the method of claim 17.

20. An apparatus comprising:
means for performing processing operations specified by program instructions;
means for storing a target program address;
means for storing a data value;
an architectural register; and means for decoding the program instructions to generate control signals to control the means for performing processing operations to perform the processing operations, wherein means for decoding the program instructions comprises branch instruction decoding means for decoding a register restoring branch instruction to cause the means for performing processing operations to determine whether the target program address and the data value are valid and if the target program address and the data value are both valid, to branch to the target program address and update the architectural register to store the data value, and otherwise to take an error action.

* * * * *